United States Patent
Xu et al.

(10) Patent No.: US 11,503,635 B2
(45) Date of Patent: Nov. 15, 2022

(54) METHOD AND DEVICE FOR PERFORMING DOWNLINK MULTIPLE USER-MULTIPLE INPUT MUPTIPLE OUTPUT TRANSMISSION, STORAGE MEDIUM, AND USER EQUIPMENT

(71) Applicant: SPREADTRUM COMMUNICATIONS (SHANGHAI) CO., LTD., Shanghai (CN)

(72) Inventors: Yanchao Xu, Shanghai (CN); Chinghwa Yu, Shanghai (CN); Yuren Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/981,259

(22) PCT Filed: Apr. 23, 2019

(86) PCT No.: PCT/CN2019/083822
§ 371 (c)(1),
(2) Date: Sep. 15, 2020

(87) PCT Pub. No.: WO2020/191842
PCT Pub. Date: Oct. 1, 2020

(65) Prior Publication Data
US 2022/0007416 A1 Jan. 6, 2022

(30) Foreign Application Priority Data
Mar. 22, 2019 (CN) .......................... 201910222652.2

(51) Int. Cl.
*H04W 74/08* (2009.01)
*H04B 7/0452* (2017.01)
*H04W 24/08* (2009.01)

(52) U.S. Cl.
CPC ...... *H04W 74/0808* (2013.01); *H04B 7/0452* (2013.01)

(58) Field of Classification Search
CPC .......................... H04W 74/0808; H04B 7/0452
See application file for complete search history.

(56) References Cited

U.S. PATENT DOCUMENTS

2011/0149882 A1* 6/2011 Gong .................... H04L 1/1685
370/329
2013/0223427 A1 8/2013 Sohn et al.
(Continued)

FOREIGN PATENT DOCUMENTS

CN 101854668 A 10/2010
CN 102013959 A 4/2011
(Continued)

OTHER PUBLICATIONS

Samsung,"Evaluation Results for NR-U", 3GPP TSG-RAN WG1 Meeting #95, Spokane, USA, Nov. 12-16, 2018, total 9 pages, R1-1814074.
(Continued)

*Primary Examiner* — Harry H Kim
(74) *Attorney, Agent, or Firm* — Kilpatrick Townsend & Stockton, LLP

(57) ABSTRACT

A method and a device for performing downlink multiple user-multiple input multiple output (DL MU-MIMO) transmission, a storage medium, and a user equipment. Said method comprises: in response to a channel competition success, performing a channel sounding procedure based on NDP; according to a preset Transmission Opportunity (TxOP) duration, or according to a busy or idle state of a channel in a first period after the channel sounding procedure based on NDP, determining whether to start to perform DL MU-MIMO transmission or not. Embodiments of the present disclosure provide a solution on how to improve
(Continued)

in response to a channel competition success, the preset TxOP duration is indicated through a preset frame — S103 a channel sounding procedure based on NDP is performed — S101 when a remaining portion of the preset TxOP duration is enough for performing DL MU-MIMO transmission, it is determined to perform DL MU-MIMO transmission — S1021 probability and success rate of performing DL MU-MIMO transmission, improving efficiency of DL MU-MIMO transmission and performance of Wi-Fi.

5 Claims, 5 Drawing Sheets

(56) References Cited

U.S. PATENT DOCUMENTS

| | | | | |
|---|---|---|---|---|
| 2015/0146654 A1* | 5/2015 | Chu | ............... | H04L 1/1887 370/329 |
| 2016/0142122 A1* | 5/2016 | Merlin | ............... | H04B 7/0626 375/267 |
| 2018/0007712 A1 | 1/2018 | Lou et al. | | |
| 2018/0220379 A1* | 8/2018 | Zhang | ............... | H04W 52/243 |
| 2018/0324851 A1 | 11/2018 | Zhang et al. | | |
| 2019/0174542 A1* | 6/2019 | Lei | ............... | H04W 74/0816 |
| 2019/0379435 A1* | 12/2019 | Kamath | ............... | H04B 7/0619 |
| 2020/0084786 A1* | 3/2020 | Sethi | ............... | H04B 7/0452 |
| 2020/0322982 A1* | 10/2020 | Wu | ............... | H04W 48/16 |

FOREIGN PATENT DOCUMENTS

| | | |
|---|---|---|
| CN | 103202085 A | 7/2013 |
| CN | 10655990 A | 4/2017 |
| CN | 107211452 A | 9/2017 |
| CN | 108702654 A | 10/2018 |
| WO | 2012093794 A2 | 7/2012 |
| WO | 2012093794 A3 | 7/2012 |
| WO | 2017172026 A1 | 10/2017 |

OTHER PUBLICATIONS

Katarzyna Kosek-Szott et al., Consequences of Performing DL MU-MIMO Transmissions with TXOP Sharing for QoS Provisioning in IEEE 802.11ac Networks, IEEE Communications Letters, total 4 pages, Dec. 31, 2017.

* cited by examiner

METHOD AND DEVICE FOR PERFORMING DOWNLINK MULTIPLE USER-MULTIPLE INPUT MUPTIPLE OUTPUT TRANSMISSION, STORAGE MEDIUM, AND USER EQUIPMENT

CROSS-REFERENCE TO RELATED APPLICATIONS

This application is the national phase of International Application No. PCT/CN2019/083822, filed on Apr. 23, 2019, which claims the benefit of priority to Chinese Patent Application No. 201910222652.2, filed on Mar. 22, 2019, and entitled "METHOD AND DEVICE FOR PERFORMING DOWNLINK MULTIPLE USER-MULTIPLE INPUT MULTIPLE OUTPUT TRANSMISSION, STORAGE MEDIUM, AND USER EQUIPMENT", the entire disclosure of which is incorporated herein by reference.

FIELD

The present disclosure generally relates to communication technology field, and more particularly, to a method and a device for performing downlink multiple user-multiple input multiple output transmission, a storage medium and a user equipment.

BACKGROUND

In 802.11ac Very High Throughput (VHT) standard protocol of Wireless-Fidelity (Wi-Fi), Downlink Multiple User-Multiple Input Multiple Output (DL MU-MIMO) transmission is introduced based on wireless multiple input and multiple output (MIMO) technology. In one embodiment, this technology can allocate data transmission of different users to different spatial streams based on MIMO, to support simultaneous transmission of multiple users and improve Wi-Fi performance.

To achieve DL MU-MIMO transmission, an Access Point (AP for short) and multiple mobile stations (STA for short) are required to perform channel sounding procedure based on NDP, where NDP is the abbreviation for Null Data PPDU, and PPDU is the abbreviation for Physical Protocol Data Unit (which can also be written as PHY Protocol Data Unit). By performing channel sounding procedure based on NDP, channel conditions between the AP and the multiple STAs can be collected for subsequent DL MU-MIMO transmission.

However, the existing processing mechanism for DL MU-MIMO transmission may have this problem: an interval between DL MU-MIMO transmission and the channel sounding procedure based on NDP is too long, as a result, channel parameters obtained by performing the channel sounding procedure based on NDP, are out of date and invalid, which reduces the probability of performing DL MU-MIMO transmission and seriously affects the transmission efficiency of DL MU-MIMO transmission, thus affecting Wi-Fi performance.

SUMMARY

Embodiments of the present disclosure provide a solution on how to improve probability and success rate of performing DL MU-MIMO, improving efficiency of DL MU-MIMO transmission and performance of Wi-Fi.

In an embodiment of the present disclosure, a method for performing downlink multiple user-multiple input multiple output transmission is provided, including: in response to a channel competition success, performing a channel sounding procedure based on NDP; and according to a preset Transmission Opportunity (TxOP) duration, or according to a busy or idle state of a channel in a first period after the channel sounding procedure based on NDP, determining whether to start to perform DL MU-MIMO transmission or not.

In some embodiments, according to a preset TxOP duration, determining whether to start to perform DL MU-MIMO transmission or not includes: when a remaining portion of the preset TxOP duration is enough for performing DL MU-MIMO transmission, determining to start to perform DL MU-MIMO transmission.

In some embodiments, after the channel competition success and before performing the channel sounding procedure based on NDP, the method for performing DL MU-MIMO transmission further includes: indicating the preset TxOP duration through a preset frame, where the preset TxOP duration includes a portion for the channel sounding procedure based on NDP and a portion for performing DL MU-MIMO transmission.

In some embodiments, the preset frame includes: a Request To Send/Clear To Send (RTS/CTS) protection frame, a CTS-2-Self protection frame or a Null Data PPDU Announcement (NDPA) frame.

In some embodiments, according to a busy or idle state of a channel in a first period after the channel sounding procedure based on NDP, determining whether to start to perform DL MU-MIMO transmission or not includes: monitoring the channel during the first period; and when a monitoring result shows that the channel is in the idle state, starting to perform DL MU-MIMO transmission.

In some embodiments, the first period is Priority Interframe Spacing (PIFS).

In an embodiment of the present disclosure, a device for performing downlink multiple user-multiple input multiple output transmission is provided, including: a channel sounding device, configured to perform a channel sounding procedure based on NDP in response to a channel competition success; and a determination device, configured to determine whether to start to perform DL MU-MIMO transmission or not, according to a preset TxOP duration, or according to a busy or idle state of a channel in a first period after the channel sounding procedure based on NDP.

In an embodiment of the present disclosure, a non-transitory storage medium having computer instructions stored therein is provided, wherein when the computer instructions are executed, the above method is performed.

In an embodiment of the present disclosure, a user equipment including a memory and a processor is provided, and the memory has computer instructions stored therein, and when the processor executes the computer instructions, the above method is performed.

Embodiments of the present disclosure may provide following advantages.

In an embodiment of the present disclosure, a method for performing downlink multiple user-multiple input multiple output is provided, including: in response to a channel competition success, performing a channel sounding procedure based on NDP; according to a preset Transmission Opportunity (TxOP) duration, or according to a busy or idle state of a channel in a first period after the channel sounding procedure based on NDP, determining whether to start to perform DL MU-MIMO transmission or not. Therefore, the probability of performing DL MU-MIMO transmission and success rate of DL MU-MIMO transmission can be improved, and the efficiency of DL MU-MIMO transmission can be increased and the performance of Wi-Fi can be improved. In one embodiment, whether to start to perform DL MU-MIMO transmission or not is determined according to the busy or idle state of the channel in the first period after the channel sounding procedure based on NDP, or according to a preset TxOP duration. Compared with prior art, solutions provided in embodiments of the present disclosure can make DL MU-MIMO transmission happen faster, and avoid waiting for a long time to perform DL MU-MIMO transmission after the channel sounding procedure based on NDP, which may result in expiration of channel parameters obtained from the channel sounding procedure based on NDP. In other words, solutions provided in embodiments of the present disclosure can allow an AP to access the channel faster, or increase priority of the AP to compete for the channel, increasing the probability of transmitting PPDU of DL MU-MIMO transmission and reducing the probability of the channel parameters obtained from the channel sounding procedure based on NDP expiring. Further, solutions provided in embodiments of the present disclosure conforms to the IEEE 802.11 standard protocol and does not cause compatibility problem to existing terminals or equipments designed based on the IEEE 802.11 standard protocol.

Furthermore, when a remaining portion of the preset TxOP duration is enough for performing DL MU-MIMO transmission, it is determined to start to perform DL MU-MIMO transmission. Therefore, after a last VHT CBF packet in the channel sounding procedure based on NDP is transmitted and a subsequent Short Interframe Space (SIFS) passes, DL MU-MIMO transmission can be started. Further, embodiments provided in the present disclosure can effectively reduce probability of collision in DL MU-MIMO transmission and increase success rate of transmission.

Furthermore, the channel is monitored during the first period; and when the monitoring result shows that the channel is in the idle state, DL MU-MIMO transmission is started. Therefore, after the last VHT CBF packet in the channel sounding procedure based on NDP is transmitted and a subsequent PIFS passes, DL MU-MIMO transmission can be started. Further, embodiments provided in the present disclosure can effectively reduce probability of collision in DL MU-MIMO transmission and increase success rate of transmission.

DETAILED DESCRIPTION

As mentioned in the background, since channel sounding procedure based on NDP which is performed between an AP and multiple STAs takes a long time, when the AP implements an existing processing mechanism for DL MU-MIMO transmission, it may have this problem: an interval between performing DL MU-MIMO transmission and the channel sounding procedure based on NDP is too long, as a result, channel parameters obtained by performing the channel sounding procedure based on NDP, are out of date and invalid, which reduces the probability of performing DL MU-MIMO transmission and seriously affects the transmission efficiency of DL MU-MIMO transmission, affecting Wi-Fi performance.

In one embodiment, existing processing mechanisms for DL MU-MIMO transmission mainly include the following two types.

First, an AP competes for a channel according to traditional Enhanced Distributed Channel Access (EDCA) mechanism (hereinafter referred to as prior art 1).

First of all, the AP implements the traditional EDCA mechanism to compete for a channel. After acquiring a channel access right, the AP and multiple STAs start to perform channel sounding procedure base on NDP. Short Interframe Space (SIFS) is used during the channel sounding procedure base on NDP, until the end of the whole procedure. When the channel sounding procedure base on NDP ends, the AP still uses the traditional EDCA mechanism to compete for a channel. When the AP acquires a channel access right, the AP and the multiple STAs start to perform DL MU-MIMO transmission, and data packets transmitted during the DL MU-MIMO transmission process include: DL MU PPDU.

In the prior art 1, the AP needs to restart channel competition according to the EDCA mechanism before DL MU-MIMO transmission, however, this mechanism cannot ensure that the AP acquires a channel access right in a short time.

Therefore, in the prior art 1, since the AP needs to compete for a channel again according to the EDCA mechanism after the channel sounding procedure base on NDP is completed, it is likely to cause DL MU-MIMO transmission of the AP to be delayed. As a result, on one hand, transmission efficiency of DL MU-MIMO transmission will be reduced; on the other hand, channel parameters obtained during the channel sounding procedure base on NDP may expire before the AP acquires a channel right again, which may result in failure of subsequent DL MU-MIMO transmission.

Figure 1:
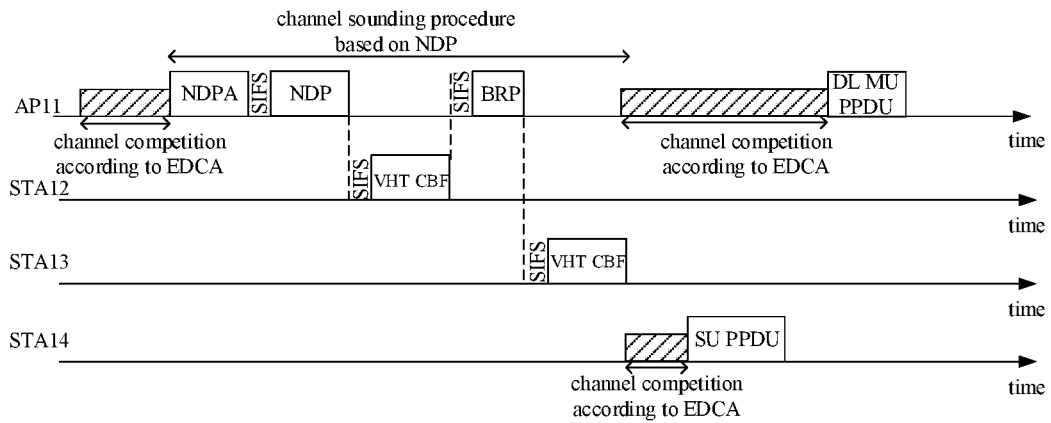
FIG. 1 schematically illustrates an interaction process between an AP and multiple STAs according to prior art 1.

In one embodiment, referring to FIG. 1, an AP11 competes for a channel according to the traditional EDCA mechanism, and duration of this process may include a sum of Arbitration Interframe Space (AIFS) and backoff timer.

After acquiring a channel access right, the AP11 starts to perform a channel sounding procedure based on NDP with a STA12, a STA13 and a STA14.

All interframe spaces during the channel sounding procedure based on NDP are SIFS.

Data packets transmitted during the channel sounding procedure based on NDP include: Null Data PPDU Announcement (NDPA); NDP; VHT Compressed Beamforming Frame (VHT CBF); and Beamforming Report Poll (BRP).

After the channel sounding procedure based on NDP is completed, the AP11 still competes for a channel again according to the traditional EDCA mechanism, and at the same time, other STAs (such as the STA14) are also performing channel competition process according to the traditional EDCA mechanism.

If the STA14 acquires the channel access right before the AP11, the DL MU-MIMO transmission of AP11 will be delayed until it acquires the channel access right. However, it is likely that channel parameters obtained during the previous channel sounding procedure based on NDP have expired, which may result in failure of subsequent DL MU-MIMO transmission. Data packets transmitted by the STA14 who acquires the channel access right may include: Single User PPDU (SU PPDU).

Second, the mechanism of an AP competing for a channel before DL MU-MIMO transmission is adjusted (hereinafter referred to as prior art 2).

Figure 2:
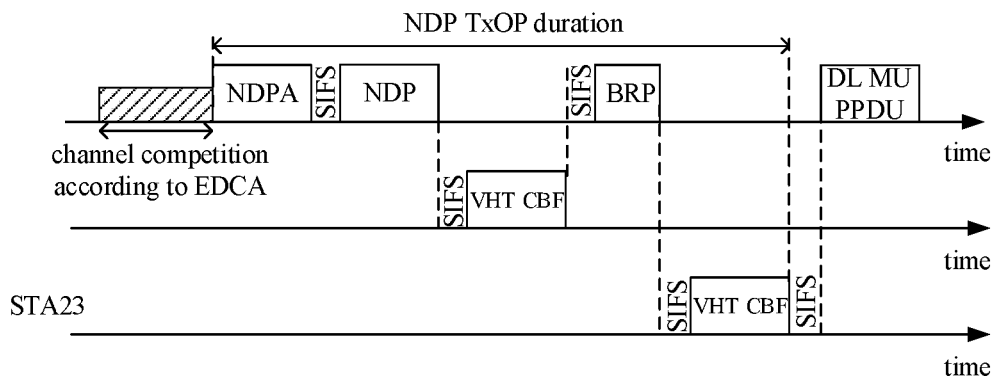
FIG. 2 schematically illustrates an interaction process between an AP and multiple STAs according to prior art 2.

In one embodiment, referring to FIG. 2, first of all, an AP21 implements the traditional EDCA mechanism to compete for a channel. After acquiring a channel access right, the AP21 and multiple STAs (an STA22 and an STA23 as shown in FIG. 2) start to perform channel sounding procedure base on NDP. SIFS is used during the channel sounding procedure base on NDP, until the end of the whole procedure. After the channel sounding procedure base on NDP is completed, the AP21 starts to perform DL MU-MIMO transmission with multiple STAs (the STA22 and the STA23 as shown in FIG. 2) after SIFS.

There are following problems in the prior art 2.

Figure 3:
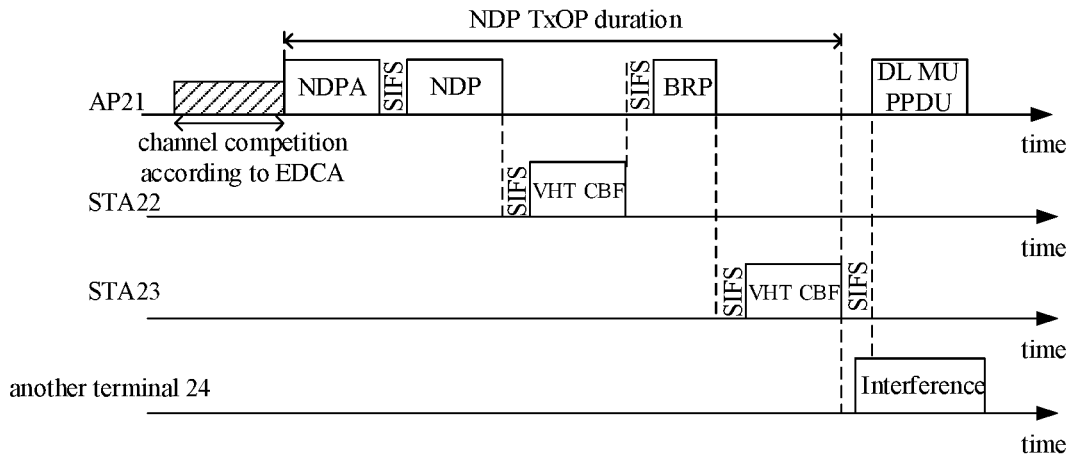
FIG. 3 schematically illustrates another interaction process between an AP and multiple STAs according to prior art 2.

NDP does not perform Clear Channel Assessment (CCA) detection within the SIFS in the Institute of Electrical and Electronic Engineers (IEEE) 802.11 standard protocol. Therefore, even if the channel is occupied rather than idle within a SIFS after the channel sounding procedure base on NDP is completed, the AP21 will still start to perform DL MU-MIMO transmission after the SIFS, resulting in collision of this DL MU-MIMO transmission and transmission failure. In one embodiment, referring to FIG. 3, after the channel sounding procedure base on NDP is completed and before the SIFS ends, another terminal 24 acquires the channel access right first, causing interference to the AP21.

In order to solve the problems described above, an embodiment of the present disclosure provide a method for performing downlink multiple user-multiple input multiple output transmission, including: in response to a channel competition success, performing a channel sounding procedure based on NDP; according to a preset TxOP duration, or according to a busy or idle state of a channel in a first period after the channel sounding procedure based on NDP, determining whether to start to perform DL MU-MIMO transmission or not.

Therefore, the probability of performing DL MU-MIMO transmission and success rate of DL MU-MIMO transmission can be improved, and the efficiency of DL MU-MIMO transmission can be increased and the performance of Wi-Fi can be improved. In one embodiment, whether to start to perform DL MU-MIMO transmission or not is determined according to the busy or idle state of the channel in the first period after the channel sounding procedure based on NDP, or according to a preset TxOP duration. Compared with prior art, solutions provided in embodiments of the present disclosure can make DL MU-MIMO transmission happen faster, and avoid waiting for a long time to perform DL MU-MIMO transmission after the channel sounding procedure based on NDP, which may result in expiration of channel parameters obtained from the channel sounding procedure based on NDP.

In other words, solutions provided in embodiments of the present disclosure can allow an AP to access the channel faster, or increase priority of the AP to compete for the channel, increasing the probability of transmitting PPDU of DL MU-MIMO transmission and reducing the probability of the channel parameters obtained from the channel sounding procedure based on NDP expiring. Further, solutions provided in embodiments of the present disclosure conforms to the IEEE 802.11 standard protocol and does not cause compatibility problem of existing terminals or equipments designed based on the IEEE 802.11 standard protocol.

In order to clarify the object, characteristic and advantages of embodiments of the present disclosure, embodiments of present disclosure will be described clearly in detail in conjunction with accompanying drawings.

Figure 4:
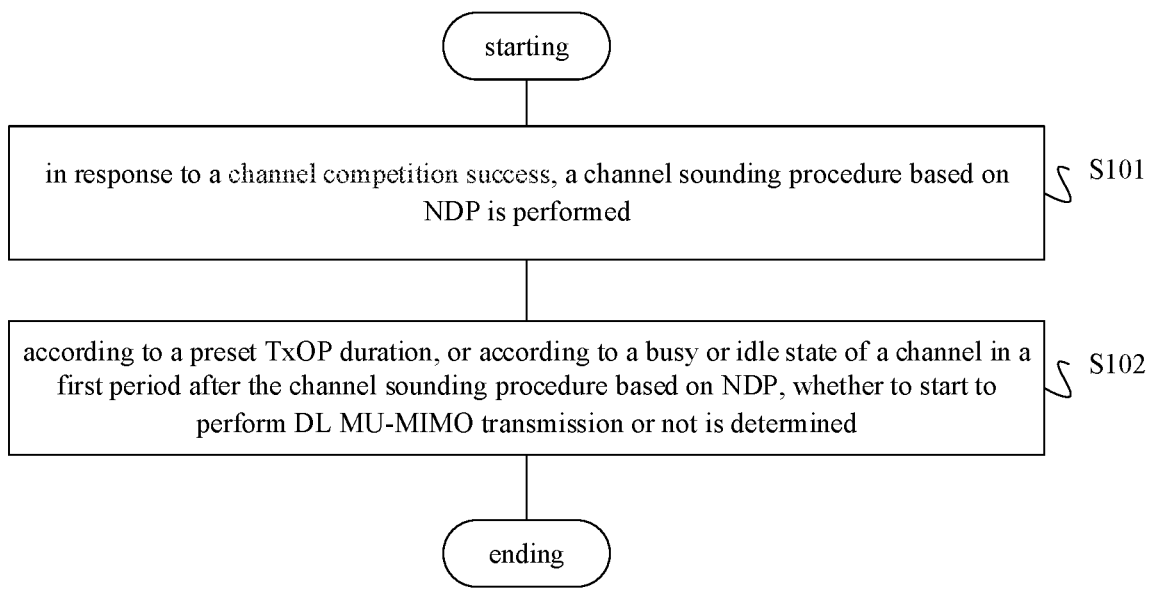
FIG. 4 schematically illustrates a flow chart of a method for performing DL MU-MIMO transmission according to an embodiment.

In one embodiment, referring to FIG. 4, FIG. 4 schematically illustrates a flow chart of a method for performing DL MU-MIMO transmission according to an embodiment. The method includes S101 and S102.

In S101, in response to a channel competition success, a channel sounding procedure based on NDP is performed.

In S102, according to a preset TxOP duration, or according to a busy or idle state of a channel in a first period after the channel sounding procedure based on NDP, whether to start to perform DL MU-MIMO transmission or not is determined.

In one embodiment, the channel competition success means the channel competition process performed based on the EDCA mechanism succeeds.

In the prior art as described above, after the channel sounding procedure based on NDP is completed, DL MU-MIMO transmission is started immediately without considering actual conditions of the channel, or a channel competition process is restarted. In one embodiment of the present disclosure, a first period is configured to continue to monitor the channel status after the channel sounding procedure based on NDP is completed; in another embodiment of the present disclosure, an appropriate preset TxOP duration is indicated in advance, so that DL MU-MIMO transmission can be performed as early as possible.

The step S102 will be described in detail hereinafter.

Figure 5:
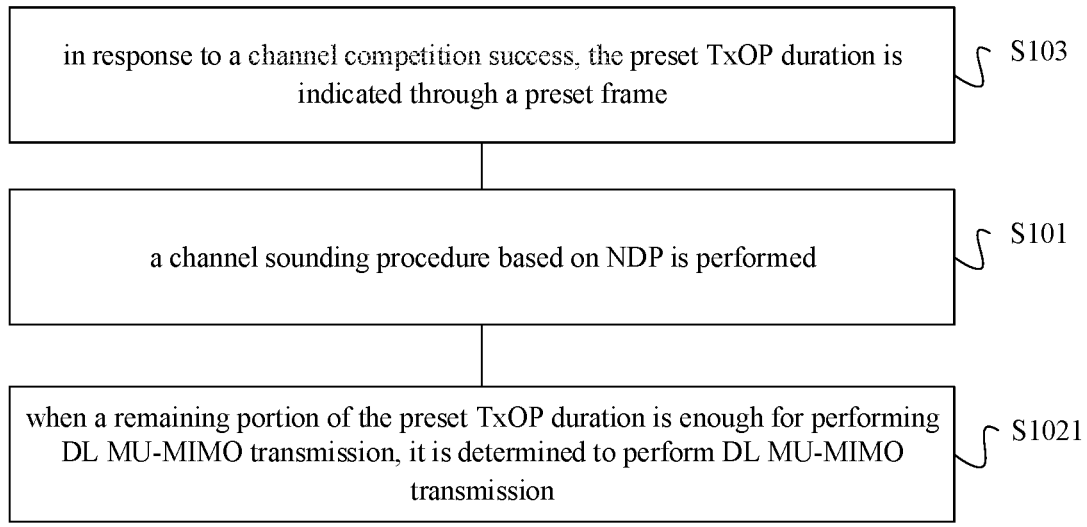
FIG. 5 schematically illustrates a flow chart of S102 as shown in FIG. 4 according to an embodiment.

According to an embodiment, referring to FIG. 5, S102 includes the following steps:

In S1021, when a remaining portion of the preset TxOP duration is enough for performing DL MU-MIMO transmission, it is determined to perform DL MU-MIMO transmission. In one embodiment, the remaining portion of the preset TxOP duration is the remaining TxOP duration after supporting an AP to perform the channel sounding procedure based on NDP.

Furthermore, according to an embodiment, before performing S101 to perform the channel sounding procedure based on NDP, the method for performing DL MU-MIMO transmission further includes S103: in response to a channel competition success, indicating the preset TxOP duration through a preset frame, where the preset TxOP duration includes a portion for the channel sounding procedure based on NDP and a portion for performing DL MU-MIMO transmission. Therefore, the preset TxOP duration can be indicated in advance to support the DL MU-MIMO transmission, and after a last VHT CBF packet in the channel sounding procedure based on NDP is transmitted and a subsequent Short Interframe Space (SIFS) passes, the DL MU-MIMO transmission can be started. Further, embodiments provided in the present disclosure can effectively reduce collision probability in DL MU-MIMO transmission and increase success rate of transmission.

In one embodiment, the preset frame is a Wi-Fi frame used to indicate the preset TxOP duration.

For example, the preset frame may include a Request To Send (RTS)/Clear To Send (CTS) protection frame.

Figure 6:
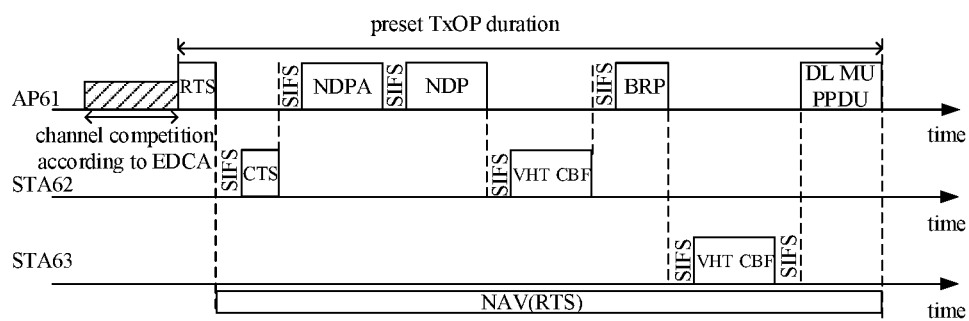
FIG. 6 schematically illustrates an application scenario diagram of a method for performing DL MU-MIMO transmission according to an embodiment.

Referring to FIG. 6, first of all, an AP61 competes for a channel according to the traditional EDCA mechanism. After acquiring the channel access right, the AP61 interacts with a Primary User (STA62 as shown in FIG. 6) by sending a traditional RTS/CTS protection frame.

In one embodiment, the AP61 may write a Duration field in the RTS/CTS protection frame, so that the preset TxOP duration indicated by this field can support the channel sounding procedure based on NDP and the subsequent DL MU-MIMO transmission.

Further, after signaling interaction process of the RTS/CTS protection frame is completed, the AP61 and multiple STAs (such as a STA62 and a STA63 shown in FIG. 6) perform the channel sounding procedure based on NDP.

Further, since the DL MU-MIMO transmission is supported by a preset TxOP time period (which may also be referred to as preset TxOP duration), after a last VHT CBF packet in the channel sounding procedure based on NDP is transmitted and a subsequent SIFS passes, the AP61 can start the DL MU-MIMO transmission without having to re-compete for the channel according to the EDCA mechanism.

In other words, in a RTS/CTS protection mechanism provided in this embodiment, a Wi-Fi device that receives the RTS protection frame can learn about how long the AP61 will occupy the channel for data transmission according to the Duration field indicated in the RST protection frame, and then set its own Network Allocation Vector (NAV) time period.

According to the embodiments described above, a length of the preset TxOP duration can be reasonably set by introducing the interactive process of RTS/CTS protection frames.

Further, according to the embodiments described above, transmission failure caused by collision of hidden nodes in the DL MU-MIMO transmission can be reduced, improving transmission efficiency of the DL MU-MIMO transmission.

According to an embodiment, the preset frame includes: a CTS-2-Self protection frame. A receiving address of the CTS-2-Self protection frame is written with an address of a terminal (an AP that executes the solution described in this embodiment) that transmits the CTS-2-Self protection frame.

Figure 7:
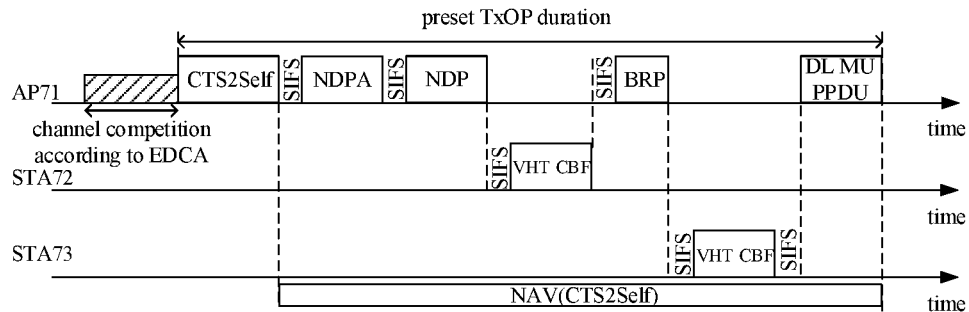
FIG. 7 schematically illustrates another application scenario diagram of a method for performing DL MU-MIMO transmission according to an embodiment.

Referring to FIG. 7, first of all, an AP71 competes for a channel according the traditional EDCA mechanism. After acquiring the channel access right, the AP71 can send itself a CTS-2-Self protection frame (CTS2Self in FIG. 7).

In one embodiment, the AP71 may write a Duration field in the CTS-2-Self protection frame, so that a preset TxOP duration indicated by this field can support the channel sounding procedure based on NDP and the subsequent DL MU-MIMO transmission.

Further, after transmitting the CTS-2-Self protection frame, the AP71 and multiple STAs (a STA72 and a STA73 shown in FIG. 7) perform a channel sounding procedure based on NDP.

Further, since the DL MU-MIMO transmission is supported by the preset TxOP duration, after a last VHT CBF packet in the channel sounding procedure based on NDP is transmitted and a subsequent SIFS passes, the AP71 can start the DL MU-MIMO transmission without having to re-compete for the channel according to the EDCA mechanism.

In other words, in a CTS-2-Self protection mechanism provided in this embodiment, a Wi-Fi device that receives the CTS-2-Self protection frame can learn about how long the AP71 will occupy the channel for data transmission according to the Duration field indicated in the CTS-2-Self protection frame, and then set its own NAV time period.

According to this embodiment, only signaling overhead of the CTS-2-Self protection frame is introduced, which can further reduce the signaling overhead compared with the embodiment shown in FIG. 6.

According to another embodiment, the preset frame includes an NDPA frame.

Figure 8:
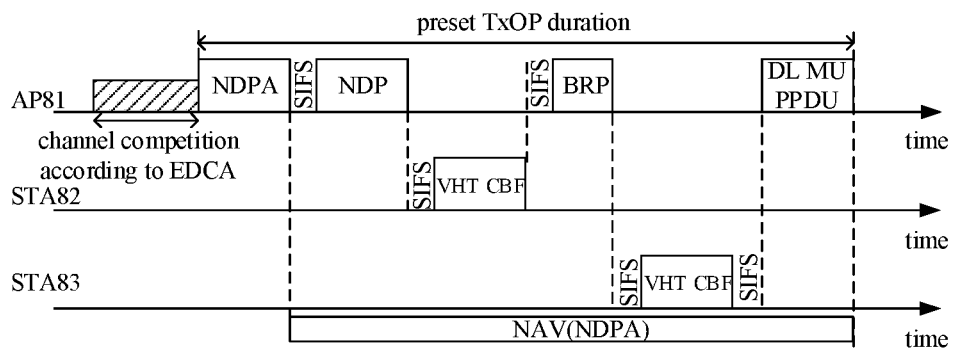
FIG. 8 schematically illustrates another application scenario diagram of a method for performing DL MU-MIMO transmission according to an embodiment.

Referring to FIG. 8, first of all, an AP81 competes for a channel according to the traditional EDCA mechanism. After acquiring the channel access right, the AP81 sends the NDPA frame, to start a channel sounding procedure based on NDP with multiple STAs (a STA82 and a STA83 as shown in FIG. 8).

In one embodiment, the AP81 may write a Duration field in the NDPA frame, so that a preset TxOP duration indicated by this field can support the channel sounding procedure based on NDP and a subsequent DL MU-MIMO transmission.

Further, since the DL MU-MIMO transmission is supported by the preset TxOP duration, after a last VHT CBF packet in the channel sounding procedure based on NDP is transmitted and a subsequent SIFS passes, the AP81 can start the DL MU-MIMO transmission without having to re-compete for the channel according to the EDCA mechanism.

In other words, in an extended NDP protection mechanism provided in this embodiment, a Wi-Fi device that receives the NDPA frame can learn about how long the AP81 will occupy the channel for data transmission according to the Duration field indicated in the NPDA frame, and then set its own NAV time period.

According to this embodiment, S103 may be performed at the beginning of performing S101 which includes the channel sounding procedure based on NDP.

Compared with the embodiments shown in FIG. 6 and FIG. 7 described above, this embodiment does not introduce extra signaling overhead.

Figure 9:
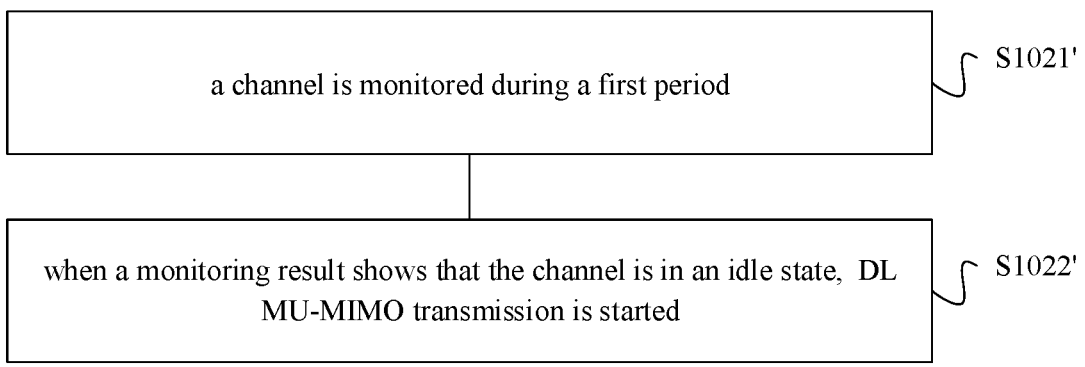
FIG. 9 schematically illustrates a flow chart of S102 as shown in FIG. 4 according to another embodiment.

According to another embodiment, referring to FIG. 9, S102 includes the following steps:

In S1021', monitoring a channel during a first period; and

In S1022', when a monitoring result shows that the channel is in an idle state, starting to perform DL MU-MIMO transmission.

Therefore, after a last VHT CBF packet in the channel sounding procedure based on NDP is transmitted and a subsequent PIFS passes, DL MU-MIMO transmission can be started. Further, this embodiment can effectively reduce collision probability in the DL MU-MIMO transmission and increase success rate of transmission.

In one embodiment, compared with the embodiments shown in FIGS. 4 to 8, the preset TxOP duration in this embodiment (marked with a TxOP duration of NDP in figures) may not cover the DL MU-MIMO transmission process. In other words, after supporting an AP to perform a channel sounding procedure based on NDP, a remaining portion of the preset TxOP duration in this embodiment cannot support the DL MU-MIMO transmission. Therefore, after the channel sounding procedure based on NDP is completed, it is necessary to monitor the channel during the first period, and when the channel is in the idle state during the first period, it is determined to start the DL MU-MIMO transmission.

Further, the first period may be longer than a SIFS, to meet the IEEE802.11 standard protocol.

In an embodiment, the first period is Priority Interframe Space (PIFS).

Figure 10:
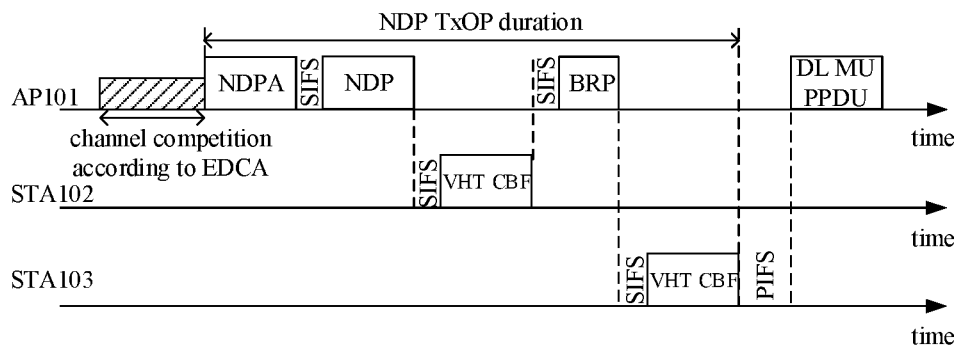
FIG. 10 schematically illustrates another application scenario diagram of a method for performing DL MU-MIMO transmission according to an embodiment.

Referring to FIG. 10, first of all, an AP101 competes for a channel according to the traditional EDCA mechanism. After acquiring the channel access right, the AP101 starts a channel sounding procedure based on NDP with multiple STAs (a STA102 and a STA103 as shown in FIG. 10). Inter-frame intervals during the whole channel sounding procedure based on NDP is SIFS until the channel sounding procedure based on NDP is completed, and duration of the whole channel sounding procedure based on NDP is the TxOP duration of NDP as shown in FIG. 10.

Further, after a last VHT CBF packet of the channel sounding procedure based on NDP is completed, the AP101 waits for a PIFS interval and continuously monitor the channel within the PIFS interval. If the channel is in the idle state, the AP101 can start DL MU-MIMO transmission when the PIFS interval ends. Otherwise, if it is monitored that the channel is busy within the PIFS interval, the AP101 gives up performing DL MU-MIMO transmission when the PIFS interval ends, and restarts to compete for the channel according to the traditional EDCA mechanism.

In other words, in this embodiment, the mechanism of an AP competing for a channel before DL MU-MIMO transmission is adjusted. After completing the channel sounding procedure based on NDP with multiple STAs, the AP will wait for a PIFS interval rather than restart the channel competition according to the traditional EDCA mechanism immediately. Further, if the monitoring result shows that the channel is in the idle state during the PIFS interval, the AP can start the DL MU-MIMO transmission when the PIFS interval ends.

Compared with the prior art 2, according to the IEEE 802.11 standard protocol, channel monitoring is allowed within PIFS intervals, and PIFS intervals are allowed to use in an AP mode, therefore this embodiment is in compliance with the IEEE 802.11 standard protocol.

Therefore, embodiments of the present disclosure provides a solution on how to improve probability and success rate of performing DL MU-MIMO transmission, improving efficiency of DL MU-MIMO transmission and performance of Wi-Fi. In one embodiment, whether to start to perform DL MU-MIMO transmission or not is determined according to the busy or idle state of the channel in the first period after the channel sounding procedure based on NDP, or according to a preset TxOP duration. Compared with prior art, solutions provided in embodiments of the present disclosure can make DL MU-MIMO transmission happen faster, and avoid waiting for a long time to perform DL MU-MIMO transmission after the channel sounding procedure based on NDP, which may result in expiration of channel parameters obtained from the channel sounding procedure based on NDP.

In other words, solutions provided in embodiments of the present disclosure can allow an AP to access the channel faster, or increase priority of the AP to compete for the channel, increasing the probability of transmitting PPDU of DL MU-MIMO transmission and reducing the probability of the channel parameters obtained from the channel sounding procedure based on NDP expiring. Further, solutions provided in embodiments of the present disclosure conforms to the IEEE 802.11 standard protocol and does not cause compatibility problem of existing terminals or equipments designed based on the IEEE 802.11 standard protocol.

Figure 11:
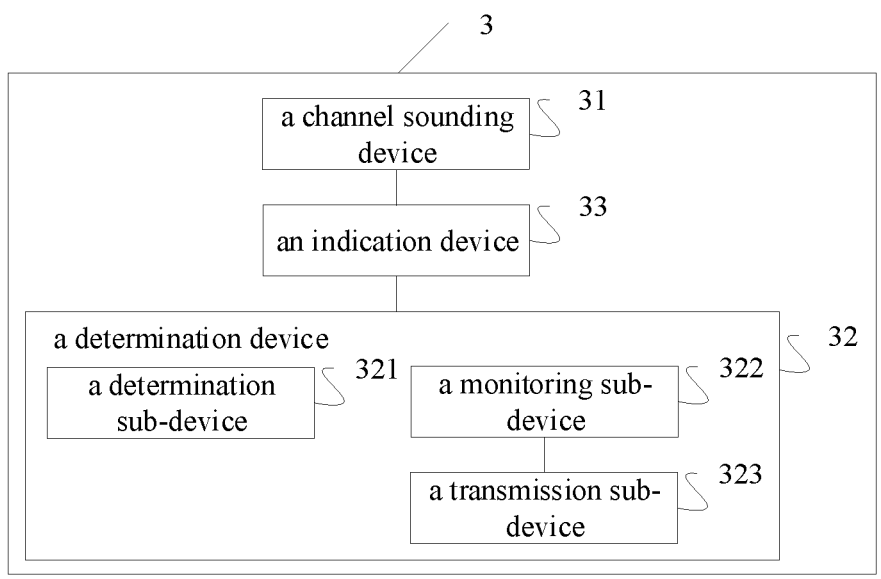
FIG. 11 schematically illustrates a structural diagram of a device for performing DL MU-MIMO transmission according to an embodiment.

FIG. 11 schematically illustrates a structural diagram of a device for performing DL MU-MIMO transmission according to an embodiment. In some embodiments, a device 3 for performing DL MU-MIMO transmission in this embodiment can be used to implement embodiments shown in FIG. 4 to FIG. 10 as described above.

In one embodiment, in this embodiment, the device 3 for performing downlink multiple user-multiple input multiple output transmission is provided, including: a channel sounding device 31, configured to perform a channel sounding procedure based on NDP in response to a channel competition success; and a determination device 32, configured to determine whether to start to perform DL MU-MIMO transmission or not, according to a preset TxOP duration, or according to a busy or idle state of the channel within a first period after the channel sounding procedure based on NDP.

In one embodiment, the determination device 32 includes: a determination sub-device 321, configured to determine to start DL MU-MIMO transmission when a remaining portion of the preset TxOP duration can support the DL MU-MIMO transmission.

In one embodiment, the device 3 for performing DL MU-MIMO transmission further includes: an indication device 33, configured to indicate the preset TxOP duration through a preset frame after successful channel competition and to before performing the channel sounding procedure based on NDP, and the preset TxOP duration covers the channel sounding procedure based on NDP and the DL MU-MIMO transmission.

In some embodiments, the preset frame includes: a RTS/CTS protection frame, a CTS-2-Self protection frame or a NDPA frame.

In one embodiment, the determination device 32 further includes: a monitoring sub-device 322, configured to monitor a channel during a first period; and a transmission sub-device 323, configured to perform DL MU-MIMO transmission when a monitoring result shows that the channel is in an idle state.

In some embodiments, the first period is a PIFS.

Principles, detailed implementation and advantages of the device 3 for performing DL MU-MIMO transmission can be found in the above descriptions as shown in FIGS. 4 to 10, and are not described here.

In an embodiment of the present disclosure, a non-transitory storage medium having computer instructions stored therein is provided, wherein when the computer instructions are executed, the above method as shown in FIGS. 4 to 10 is performed. The storage medium may be a computer readable storage medium, for example, including a non-volatile or non-transitory memory, a ROM, a RAM, a magnetic disk, an optical disk, or the like.

In an embodiment of the present disclosure, a user equipment including a memory and a processor is provided, and the memory has computer instructions stored therein, and when the processor executes the computer instructions, the above method as shown in FIGS. 4 to 10 is performed. The user equipment may include but not limited to a Wi-Fi device, such as an AP working in a Wi-Fi VHT scenario.

What is claimed is:

1. A method for performing downlink multiple user-multiple input multiple output (DL MU-MIMO) transmission, comprising:
   in response to a channel competition success, performing a channel sounding procedure based on Null Data Physical Protocol Data Unit (NDP); and
   according to a preset Transmission Opportunity (TxOP) duration, determining whether to start to perform DL MU-MIMO transmission or not,
   wherein according to the preset TxOP duration, determining whether to start to perform DL MU-MIMO transmission or not comprises: based on a remaining portion of the preset TxOP duration being enough for performing DL MU-MIMO transmission, determining to start to perform DL transmission,
   wherein following the channel competition success and prior to performing the channel sounding procedure based on NDP, the method further comprises: indicating the preset TxOP duration through a preset frame.

2. The method according to claim 1, wherein the preset TxOP duration comprises a portion for the channel sounding procedure based on NDP and a portion for performing DL MU-MIMO transmission.

3. The method according to claim 2, wherein the preset frame comprises: a Request To Send/Clear To Send (RTS/CTS) protection frame, a CTS-to-Self protection frame or a Null Data PPDU Announcement (NDPA) frame.

4. A non-transitory storage medium having computer instructions stored therein, wherein when the computer instructions are executed by a processor, the processor is caused to:
   in response to a channel competition success, indicate a preset Transmission Opportunity (TROP) duration through a preset frame, and perform a channel sounding procedure based on Null Data Physical Protocol Data Unit (NDP); and
   according to the preset TxOP duration, determine whether to start to perform Downlink Multiple User-Multiple Input Multiple Output (DL MU-MIMO) transmission or not,
   wherein according to the preset TxOP duration, determining whether to start to perform DL MU-MIMO transmission or not comprises: based on a remaining portion of the preset TxOP duration being enough for performing DL MU-MIMO transmission, determining to start to perform DL MU-MIMO transmission.

5. An access point comprising a memory and a processor, wherein the memory has computer instructions stored therein, and when the processor executes the computer instructions, the processor is caused to:
   in response to a channel competition success, indicate a preset Transmission Opportunity (TROP) duration through a preset frame, and perform a channel sounding procedure based on Null Data Physical Protocol Data Unit (NDP); and
   according to the preset TxOP duration, determine whether to start to perform Downlink Multiple User-Multiple Input Multiple Output (DL MU-MIMO) transmission or not,
   wherein according to the preset TxOP duration, determining whether to start to perform DL MU-MIMO transmission or not comprises: based on a remaining portion of the preset TxOP duration being enough for performing DL MU-MIMO transmission, determining to start to perform DL MU-MIMO transmission.

* * * * *